United States Patent [19]

Hamilton et al.

[11] 4,265,434

[45] May 5, 1981

[54] HYDRAULIC CLAMP

[75] Inventors: Harold V. Hamilton, Bedford, Mass.; Harold A. Melendy, Northridge, Calif.

[73] Assignee: Barry Wright Corporation, Watertown, Mass.

[21] Appl. No.: 65,006

[22] Filed: Aug. 8, 1979

[51] Int. Cl.³ .................................... B23Q 3/08

[52] U.S. Cl. .................................... 269/27; 92/33

[58] Field of Search .................................... 269/27, 31-32, 269/24, 20; 92/2, 33

[56] References Cited

U.S. PATENT DOCUMENTS

| | | | |
|---|---|---|---|
| 3,362,301 | 1/1968 | Kohlitz | 269/27 |
| 3,572,216 | 3/1971 | Sessody | 92/33 |
| 3,605,569 | 9/1971 | Sessody | 92/33 |
| 3,948,502 | 4/1976 | Waller et al. | 269/27 |
| 4,164,344 | 8/1979 | Deragne | 269/27 |

*Primary Examiner*—Robert C. Watson

*Attorney, Agent, or Firm*—Milton E. Gilbert; Gary E. Ross

[57] ABSTRACT

A hydraulic clamp comprising an assembly of concentrically-arranged parts wherein axial movement of a first part effects rotation of a second part and axial movement of a third part effects a corresponding axial movement of the second part and wherein the first part controls supply of pressure fluid to the third part so that rotation is first imparted to the second part and thereafter axial movement is imparted thereto and wherein a clamp arm is fixed to said second part.

16 Claims, 1 Drawing Figure

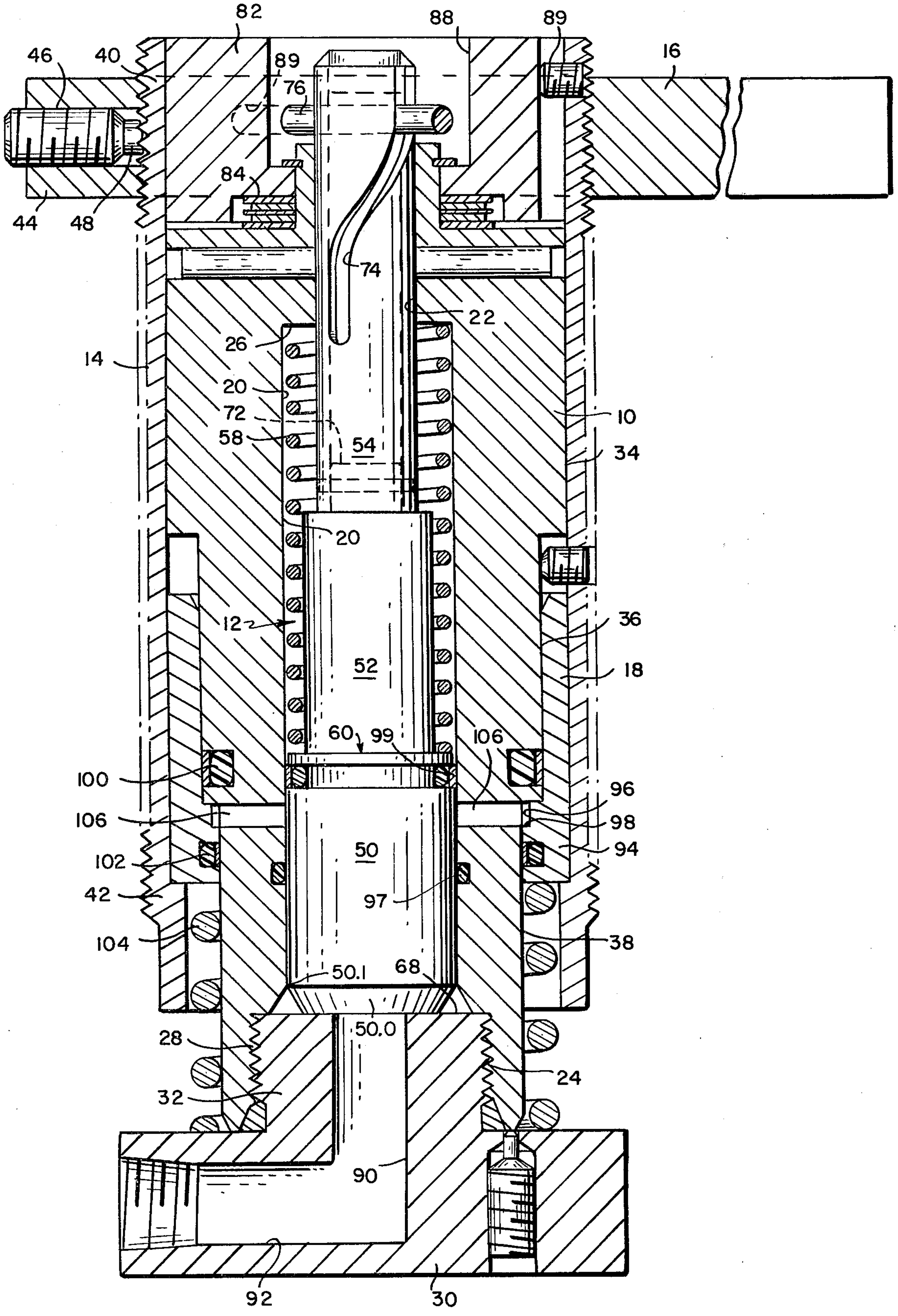
82
88
89
46
40
89
76
16
84
44
48
74
22
26
14
20
72
10
58
54
34
20
12
36
52
18
60
99
106
100
96
106
98
102
94
50
42
97
104
38
50.1
68
50.0
28
24
32
90
92
30

HYDRAULIC CLAMP

BACKGROUND OF THE INVENTION

Hydraulic clamps are disclosed in such patents as U.S. Pat. Nos. 3,948,502; 3,605,569; and 3,572,216 wherein a clamp arm is supported for rotational movement to a position for clamping and then moved rectilinearly to apply clamping pressure. In these patents a rectilinearly-moved piston is used to impart rotation of the clamp arm through the intermediary of an inclined cam. The structure shown in these patents is considered to be complex and difficult to manufacture economically. The present invention has for its purpose to employ a fewer number of component parts in a different and less complex combination; which enables a smaller swing clamp arm so as to enable clamping workpieces with clamp arms of minimum size; which provides for greater rigidity and strength.

SUMMARY OF THE INVENTION

A hydraulic clamp comprising a clamp body, a clamp sleeve mounted to the body for rotation about a predetermined axis and for axial movement thereon, a clamp arm fixed to the sleeve at right angles to said axis and means for successively effecting rotation of the clamp sleeve and axial movement thereof on the clamp body. There is a piston sleeve movable axially of the clamp body operable by such axial movement to effect a corresponding axial movement of the clamp sleeve and means for first supplying a pressure fluid to the piston to move it axially in a direction to effect rotation of the clamp arm to a clamp position and then to the clamp sleeve to effect axial movement of the clamp arm to apply clamping action thereto.

The means for successively effecting rotation of the clamp sleeve and axial movement thereof comprises a converter mounted within the clamp sleeve at one end of the clamp body connecting the piston to the clamp sleeve.

The invention will now be described in greater detail with reference to the accompanying drawing which shows the hydraulic clamp of this invention partly in section and partly in elevation.

Referring to the drawing, the hydraulic clamp comprises an assembly of concentrically-arranged parts comprising a clamp body 10, a piston 12, a piston sleeve 18 and a clamp sleeve 14 to which there is fixed a clamp arm 16.

The clamp body 10 is cylindrical and contains intermediate its upper and lower ends an axial bore 20, the ends of which terminate short of the ends of the body 10. A bore 22 of smaller diameter than the bore 20 extends from the upper end of the bore 20 through the upper end of the body 10 and a bore 24 at the lower end of the body extends from the lower end of the bore 20 through the lower end of the body. The small diameter bore 22 in conjunction with the bore 20 defines at the upper end a downwardly-facing annular shoulder 26. The large diameter bore 24 at the lower end is provided with threads 28, and a base 30 provided with a threaded post 32. The base 30 is screwed into the lower end of the body 10 and provides support for the latter.

Externally, the body 10 has axially-disposed portions of three diameters, a portion 34 of large diameter; a portion 36 of intermediate diameter; and a portion 38 of smaller diameter.

The clamp sleeve 14 is mounted on the body 10 so as to be rotatable thereon and axially movable thereon. The upper end 40 of the clamp sleeve 14 extends upwardly beyond the upper end of the body 10 and the other end, the lower end 42, extends downwardly beyond the portion 36 of intermediate diameter into overlapping relation with portion 38 of smaller diameter, so that while it fits closely the upper end of the body 10; it defines, with the portions of intermediate and smaller diameters, annular spaces between the body and the clamp sleeve.

The clamp arm 16 is adjustably mounted to the exterior of the clamp sleeve 14 in a horizontal position. As illustrated, the clamp arm 16 comprises an annular collar 44 with which the arm is integral which is threaded onto the upper end of the clamp sleeve and non-rotatably fixed in a predetermined position of adjustment by means of a set screw 46, and a nylon threaded button 48 engaged with a thread formed in the outer surface of the clamp sleeve.

The piston 12 is mounted in the bore 20 and comprises a part 50 which corresponds in diameter to the inside diameter of the bore, a part 52 of smaller diameter and a part 54 of a still smaller diameter such as to extend through the bore 22. The smaller diameter portions of the piston provide an annular space about the piston within the bore 20 for receiving under compression a coiled spring 58, one end of which is supported at the shoulder 60 defined by the junction of the portions 50 and 52, and the other end of which is supported by the downwardly-facing shoulder 26 at the junction of the bore 20 and the bore 22. The threaded post 32 of the base 30 which is screwed into the lower end of the body 10 provides an upwardly-facing surface 68 and the lower end of the piston is held firmly against this surface by means of the aforesaid spring. The parts 50 and 52 are of solid cross section and the part 54 is a sleeve which is mounted on and fixed to the part 52 by means of a stud 72. The part 54 extends upwardly into a converter head 82 rotatably mounted at the upper end of the body 10 within the portion of the clamp sleeve extending above the body on suitable frictionless bearings 84 and has diametrically-arranged, inclined slots 74—74. The converter head 82 contains a central bore 88 and diametrically arranged holes 89—89 for receiving the ends of a pin 76 arranged to extend through the slots 74—74 in the sleeve 54 to thus connect the latter to the converter head 82. Axial movement of the piston will, accordingly, effect rotation of the pin 76 and converter head 82. The converter head 82 is connected to the inner side of the clamp sleeve by means of a screw 89 so that rotation of the converter head is imparted to the clamp sleeve. The sleeve 54, inclined slots 74—74, pin 76 and converter head 82, in conjunction, comprise kinematic means which are operable by axial movement of the piston to convert the axial movement of the piston to rotational movement of the clamp sleeve and, hence, the clamp affixed thereto.

The base 30 contains a vertical passage 90 and a horizontal passage 92 through which pressure fluid may be supplied to the lower end of the piston to move the piston axially within the body 10 upwardly, that is, away from the base and, by such movement, to compress the spring 58 and effect rotation of the pin 76 which, in turn, effect rotation of the clamp arm 16 to a position above the workpiece which is to be clamped.

Axial movement of the clamp arm 16 to apply the clamping force or pressure is achieved by means of the piston sleeve 18 mounted on the portion 36 of intermediate diameter for rotation thereon and axial movement thereon between the outer surface of the clamp body 10 and the inner surface of the clamp sleeve 14. The piston sleeve 18 snugly fits the portion of intermediate diameter and is provided with a portion 94 which overlaps the portion 38 of smaller diameter fitting the latter and, intermediate these two portions, an annular portion 96 which is of larger diameter than the smaller portion and which provides inwardly of the piston sleeve an annular surface 98 which is perpendicular to the axis of the bore. Piston rings 100 and 102 are disposed between the piston sleeve 18 and the portions of the clamp body with which it is slidably engaged. A coiled spring 104 is disposed about the portion 38 of smaller diameter under compression with one end bearing against the lower end of the piston sleeve 18 and the other end bearing against the base. The coiled spring 104 normally holds the piston sleeve in its retracted position.

Transversely-disposed ports 106—106 are provided in the clamp body 10 at the junction of the intermediate and smaller portions so that its ends are in communication with the annular space 96. An O-ring 99 is recessed into the part 50 of the piston below the shoulder 60 and an O-ring 97 is recessed into the bore below the ports 106—106.

As thus constructed, when hydraulic fluid is supplied to the lower end of the piston through the passages 90 and 92 in the base, the piston is elevated in opposition to the coiled spring 58, and such elevation through the intermediate of the inclined slots 74—74 rotates the pin 76 at the upper end of the spindle which, in turn, rotates the clamp sleeve 14 and the clamp arm 16 fixed thereto through an angle of 90° to a position in alignment with the workpiece which is to be clamped. The lower end of the part 50 of the piston is tapered at 50.0 and when the lower edge 50.1 at the base of the taper passes the O-ring 97, the fluid pressure flows laterally through the ports 106 into the annular space at the inner side of the piston sleeve 18 and exerts a pressure on the annular surface 98 which moves the piston sleeve 18 downwardly in opposition to the spring 104 and this downward movement produces a corresponding downward movement of the clamp sleeve and, hence, of the clamp arm.

The clamp stroke is approximately ½ inch and a clamping pressure of from 100 to 1200 pounds is available.

The structure as described is very compact, thus requiring very little space, and the fluid pressure is supplied thereto at first at a relatively low pressure to effect the initial movement of the piston for the purpose of rotating the clamp to a clamp position and then at a higher pressure to effect clamping. A two-stage intensifier system disclosed in pending application Serial No. 060,676, filed July 25, 1979 may be used for this purpose.

What is claimed is:

1. A hydraulic clamp comprising a clamp body, a clamp sleeve mounted to the body for rotation about a predetermined axis and for axial movement thereon, a clamp arm fixed to the clamp sleeve at right angles to said axis and means for successively effecting rotation of the clamp sleeve and axial movement thereof on the clamp body comprising a piston movable axially of the clamp body, means connecting one end of the piston to the clamp sleeve so that axial movement of the piston effects rotation of the clamp sleeve, a piston sleeve movable axially of the clamp body operable by such axial movement to effect a corresponding axial movement of the clamp sleeve and means for first supplying a pressure fluid to the piston to move it axially in a direction to effect rotation of the arm to a clamp position and then to the piston sleeve to effect axial movement of the arm to apply clamping action thereto.

2. A hydraulic swing clamp comprising a clamp body containing an axial hole, a clamp sleeve mounted on the clamp body for rotation about the axis of the clamp body and for axial movement thereon, a clamp arm fixed to the clamp sleeve at right angles to said axis, and means for successively effecting rotation of the clamp sleeve and axial movement thereof comprising a piston mounted within the axial hole of the clamp body, said piston being movable axially in said hole, a converter mounted within the clamp sleeve at one end of the clamp body connecting the piston to the clamp sleeve so that axial movement of the piston effects rotation of the clamp sleeve, a piston sleeve arranged within the clamp sleeve at the other end of the clamp body movable axially on the clamp body and operable by such movement to move the clamp sleeve axially a corresponding amount, and means for supplying pressure fluid first to the piston to move the piston axially in a direction to effect rotation of the clamp arm and then to the piston sleeve in a direction to effect axial movement of the clamp arm.

3. A hydraulic clamp according to claim 1 wherein the clamp arm is adjustably mounted to the clamp sleeve and there is means for fixing the clamp arm in its position of adjustment.

4. A hydraulic clamp according to claim 3 wherein said means comprises a button and set screw for setting it against the clamp sleeve.

5. A hydraulic clamp comprising a clamp body containing an axial bore and intermediate its ends a transverse bore, a rigid clamp arm mounted to the clamp body for rotation about its axis and for axial movement thereon, a piston movable axially in the bore, kinematic means connecting one end of the piston to the arm operable by axial movement of the piston to effect rotation of the arm, a piston sleeve movable axially of the body, said piston sleeve being in communication with the ends of the transverse bore, means connecting the piston sleeve to the arm so that axial movement of the piston sleeve effects a corresponding axial movement of the arm, and means for supplying fluid pressure to the piston for movement in a direction to effect rotation of the arm and, by such movement, permit fluid to flow through the transverse bore, and said piston sleeve being movable by the fluid pressure in the transverse bore in a direction to move the arm axially to effect clamping.

6. A hydraulid clamp comprising a clamp body, first, second and third parts mounted to the body for axial and rotational movement, means connecting the first part to the second part such that axial movement of the first part effects rotation of the second part, means connecting the third part to the second part such that axial movement of the third part effects the corresponding axial movement of the second part, means for supplying pressure fluid to the first part to effect axial movement thereof and thereafter to the third part to effect axial movement thereof and a clamp arm fixed to the second part movable thereby in rotation to a clamp position and axially to apply a clamping pressure.

7. A hydraulic clamp according to claim 6 wherein there is spring means yieldably opposing movement of the first part and spring means yieldably opposing movement of the third part.

8. A hydraulic clamp comprising a clamp body containing an axial hole, a first part mounted in the hole for axial movement therein, second and third parts mounted on the exterior of the body for rotation and axial movement thereon with the third part disposed between the body and the second part, kinematic means connecting an end of the first part to the second part such that axial movement of the first part will effect rotation of the second part, mutually engaged means at the inner faces of the second and third parts which impart axial movement of the third part to the second part, an axial passage at one end of the body in communication with the axial hole through which a pressure fluid is supplied to the first part to move the latter axially, a transverse passage in the body in communication with the axial hole arranged to allow fluid flow by axial movement of the first part and an annular surface at the inner side of the third part with which the ends of the transverse passage communicate such that the pressure fluid delivered through the transverse passage will effect axial movement of the third part.

9. A hydraulic clamp comprising a cylindrical clamp body containing an axial hole, a piston mounted in the axial hole with one end exposed at one end of the axial hole and the other end extending through the hole at the opposite end, said piston being movable axially in the hole but not in rotation, a clamp sleeve mounted on the exterior of the body for rotation and axial movement, kinematic means connecting the other end of the piston to the clamp sleeve such that axial movement of the piston effects rotation of the clamp sleeve, a piston sleeve recessed between the exterior surface of the clamp body and the interior surface of the clamp sleeve, said piston sleeve being rotatable and axially movable on the clamp body, an annular shoulder at the inner side of the clamp sleeve with which an end of the piston sleeve is engaged such that axial movement of the piston sleeve effects axial movement of the clamp sleeve, an axial passage at the one end of the body through which pressure fluid is delivered to the exposed end of the piston to effect axial movement thereof, a transverse passage in the body intermediate the ends of the axial bore, one end of which is in communication with the bore and an annular surface at the inner side of the piston sleeve perpendicular to its axis in communication with the other end of said transverse passage such that the pressure fluid which flows through the passage will effect axial movement of the piston sleeve.

10. A hydraulic clamp comprising a cylinder containing an axial bore intermediate its ends and a transverse passage intermediate the ends of the axial bore, an opening at one end of larger diameter than the axial bore, a base block threaded into said opening of larger diameter, an opening at the other end of smaller diameter defining in conjunction with the axial bore an inwardly-facing shoulder, a piston in the axial bore with one end seated against the base, a sealing ring recessed into the bore below the transverse passage, a shoulder on the piston beyond the transverse bore, a coiled spring mounted in compression about the piston between the shoulder on the piston and the inwardly-facing shoulder holding the piston against the base, a sleeve extending from the piston through the opening of smaller diameter beyond the end of the cylinder, a clamp sleeve mounted to the cylinder for rotation and axial movement thereon with a portion extending beyond the cylinder in concentric relation to the extending sleeve, kinematic means connecting the extending sleeve to the cylinder such that axial movement of the piston effects rotation of the clamp sleeve, a piston sleeve recessed between the external surface of the cylinder and the inner side of the clamp sleeve overlapping the end of the transverse bore, said piston sleeve containing a peripheral groove defining an annular surface perpendicular to its axis, means interconnecting the piston sleeve and clamp sleeve so that axial movement of the piston sleeve will effect axial movement of the clamp sleeve, a spring disposed about the cylinder in compression between the piston sleeve and the base block holding the piston sleeve retracted, said base block containing an axial passage through which pressure is delivered to the one end of the piston to move the latter in a direction to rotate the clamp sleeve and when the lower end of the piston moves beyond the sealing ring to supply pressure to the annular surface of the piston sleeve to move the piston sleeve and, hence, the clamp sleeve in a direction to effect clamping and a clamp arm fixed to the clamp sleeve for rotational and axial movement.

11. A hydraulic clamp comprising a clamp body containing axially thereof a bore, one end of which has a portion of reduced diameter and the other end of enlarged diameter, said portion of reduced diameter defining at said one end an inwardly-facing shoulder and said portion of larger diameter defining at said other end an outwardly-facing shoulder, a piston mounted in the bore with one end exposed at the end of larger diameter and the other end extending through the end of smaller diameter, an annular shoulder on the piston, a coiled spring disposed about the piston with one end in engagement with the annular shoulder thereon and its other end with the inwardly-facing shoulder such as to yieldably hold the piston with one end adjacent the end of larger diameter, a clamp sleeve mounted on the body for rotation and axial movement thereon, said clamp sleeve extending beyond the end of the clamp body and surrounding the extending portion of the piston, means connecting the extending end of the piston to the extending end of the clamp sleeve such that axial movement of the piston will effect rotation of the clamp sleeve, a piston sleeve recessed between the clamp body and the clamp sleeve, means connecting the piston sleeve with the clamp sleeve so that axial movement of the latter effects axial movement of the clamp sleeve, a coiled spring disposed about the clamp body in compression with one end engaged with the piston sleeve which holds the piston sleeve retracted and means for supplying fluid pressure to the exposed end of the piston to move it in a direction to rotate the clamp arm to a clamping position and thereafter for supplying pressure to the clamp sleeve to move it in a direction to apply clamping pressure to the clamp arm.

12. A hydraulic clamp according to claim 10 wherein the threaded portion of the base has a flat surface perpendicular to the axis of the axial bore which provides a seat for the lower end of the piston.

13. A hydraulic clamp according to claim 5 wherein the kinematic means comprises a part extending axially from one end of the piston containing inclined slots, a pin extending through the slots and means coupling the ends of the pin to the arm so that axial movement of the piston effects rotation of the arm.

14. A hydraulic clamp according to claim 13 wherein said last means comprises a part to which the arm is fixed containing diametrically-arranged holes in which the ends of the pin are engaged.

15. A hydraulic clamp comprising a cylinder containing an axial bore, said cylinder having portions of large, intermediate and small diameter axially disposed with respect to the axis of the bore, a clamp sleeve mounted on a portion of large diameter for rotation and axial movement thereon with an end extending beyond the large and intermediate diameter portions of the cylinder, a piston sleeve mounted on the portion of intermediate diameter with an end slidably engaged with the portion of smaller diameter, said piston sleeve containing an internal annular groove of larger diameter than the portion of smaller diameter, a piston mounted in the axial bore with a portion extending from one end thereof, kinematic means connecting the extending portion of the piston to the clamp sleeve operable by axial movement of the piston to effect rotation of the clamp sleeve, means connecting the clamp sleeve to the piston sleeve such that axial movement of the piston sleeve will effext axial movement of the clamp sleeve, a base threaded into the bore containing an inlet port, transversely-located ports in the cylinder in communication at their inner ends with the axial bore and at their outer ends with said groove, said ports being located intermediate the ends of the axial bore such as to be supplied with fluid by axial movement of the piston to supply fluid pressure to the piston sleeve to move it in the opposite direction and a clamp arm fixed to said clamp sleeve.

16. A hydraulic clamp comprising a plurality of concentrically-arranged parts comprising an outer part which is rotatable and axially movable, an inner part which is movable axially but not in rotation, kinematic means connecting the inner part to the outer part operable by axial movement of the inner part to effect rotation of the outer part, an intermediate part which is rotatable and axially movable, means connecting the intermediate and outer parts so that axial movement of the intermediate part effects axial movement of the outer part, means for supplying fluid pressure to one end of the inner part to effect its axial movement, means internally of the intermediate part defining an end surface facing oppositely the end of the inner part, and means controlled by the axial movement of the inner part to supply pressure fluid to the inner part and when the latter has moved a predetermined distance, to supply pressure to the intermediate part.

* * * * *